Figure 1:
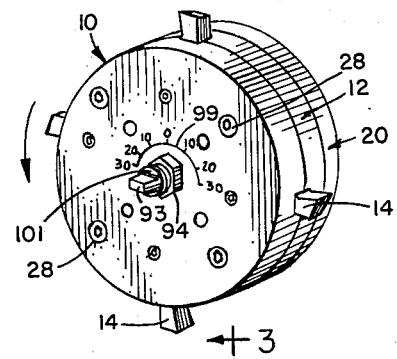

March 13, 1962  D. G. JUDD  3,024,674
MULTIPLE TOOL BORING HEAD WITH ADJUSTABLE TOOL BITS
Filed Sept. 17, 1959  3 Sheets-Sheet 1

INVENTOR:
DONALD G. JUDD
BY
ATT'Y

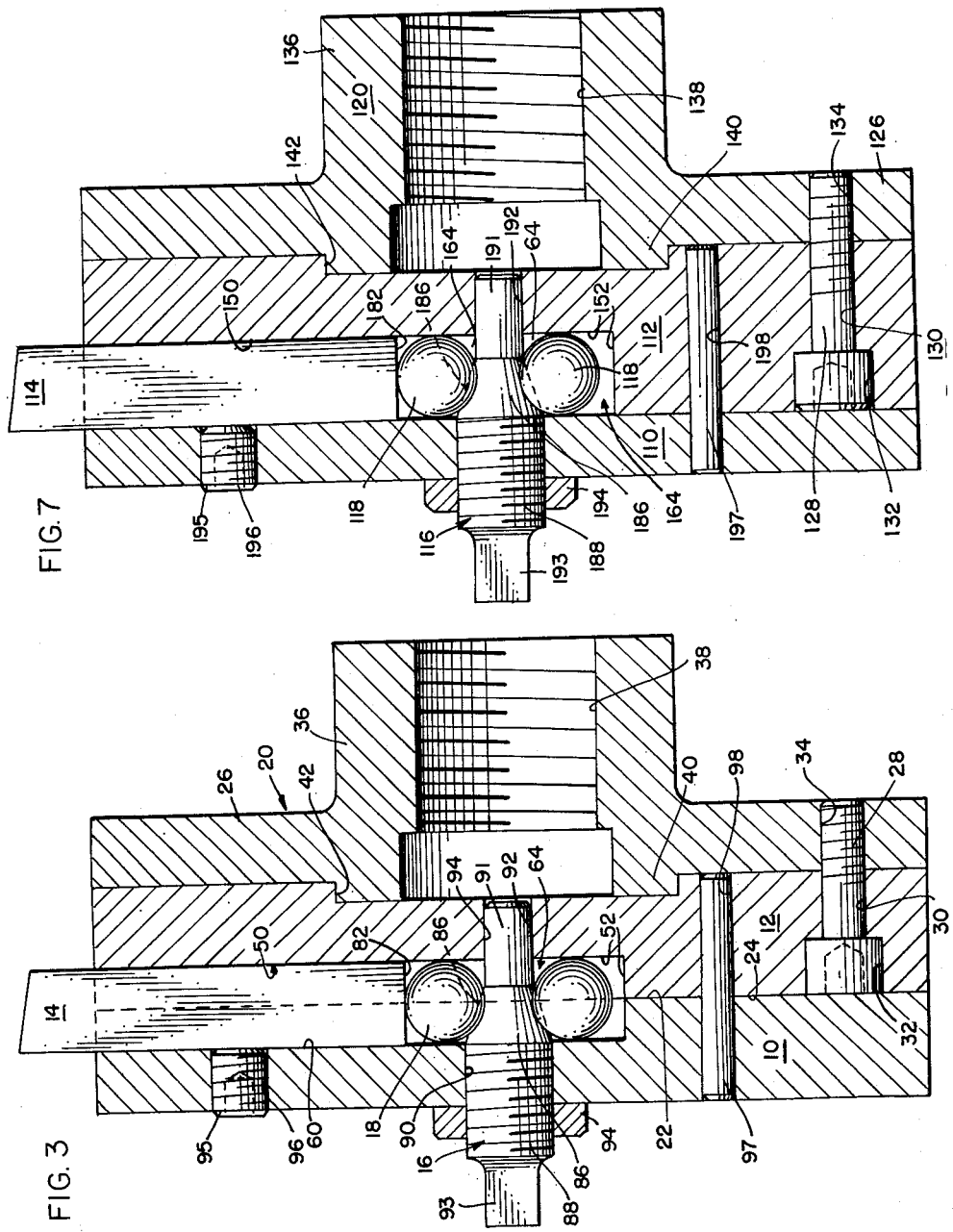

March 13, 1962 D. G. JUDD 3,024,674
MULTIPLE TOOL BORING HEAD WITH ADJUSTABLE TOOL BITS
Filed Sept. 17, 1959 3 Sheets-Sheet 3
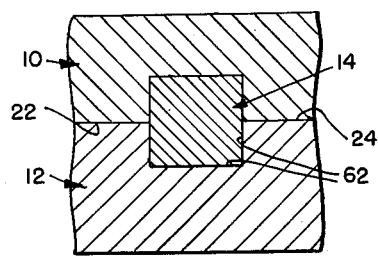
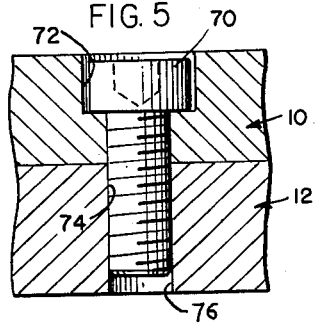
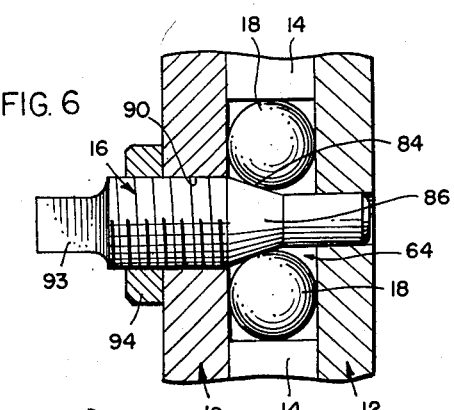
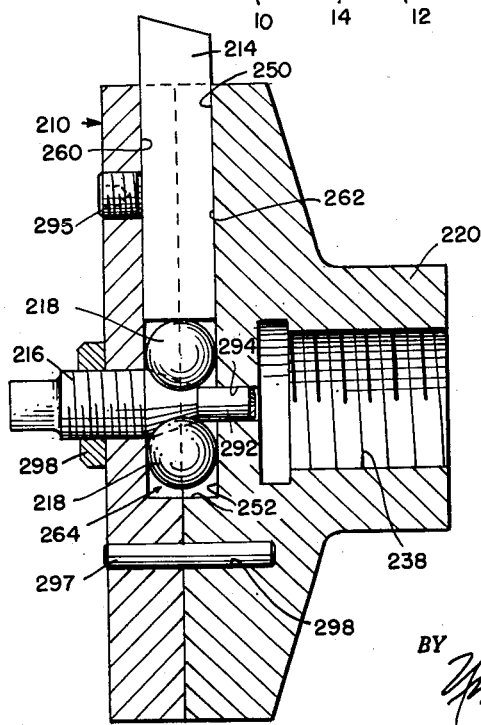
INVENTOR:
DONALD G. JUDD
BY
ATT'Y United States Patent Office 3,024,674
Patented Mar. 13, 1962

1

3,024,674
MULTIPLE TOOL BORING HEAD WITH ADJUSTABLE TOOL BITS
Donald G. Judd, Tiffin, Ohio, assignor to Webster Manufacturing, Inc., Tiffin, Ohio, a corporation of Ohio
Filed Sept. 17, 1959, Ser. No. 840,614
1 Claim. (Cl. 77—58)

The present invention relates to multiple tool boring heads and has particular reference to boring heads of the type employing radially adjustable tool bits, or tool bits which assume positions in the head which are approximately radial and which are capable of adjustment axially of the tool bits so as to present components of motion which are largely radial. The invention is primarily concerned with a novel adjusting means whereby, with a minimum of effort, all of the tool bits associated with a given boring head may simultaneously be adjusted and thereafter securely locked in their adjusted positions.

It is among the principal objects of the present invention to provide a multiple tool boring head having associated therewith novel means for effecting radial, or substantially radial, outward adjustment of the various tool bits associated with the boring head, and wherein, by manipulation of a single adjusting element, extremely accurate and equalized radial adjustment of the various tool bits may be obtained so that the various tool bits will exert equal pressure upon the work undergoing boring and effect equal depths of cut, thereby materially prolonging tool life.

Another and important object of the invention, in an adjustable boring head of this character, is to provide such an adjusting means for simultaneous adjustment of the various tool bits, utilizing a single rotary adjusting member or screw, and wherein a relatively large component of turning movement of the adjusting member will result in relatively small components of radial adjustment of the tool bits, thus enabling calibration of the adjusting member within very fine limits.

A still further object of the invention is to provide an adjustable multiple tool boring head having a single adjusting member as briefly outlined above wherein the member is effectively piloted against bending or other lateral displacement so that it will transmit positive motion to the various tool bits which cooperate therewith equally in all radial directions.

Yet another object of the invention is to provide an adjusting means for the tool bits of a boring head and which is capable of transmitting motion to the tool bits through a power train having an extremely large amplification factor whereby a powerful dislodgment force is applied to all of the tool bits so that any tendency for the tool bits to stick or bind is readily overcome.

The provision of an adjustable multiple tool boring head which is extremely simple in its construction and which, therefore, may be manufactured at a low cost; one which is possessed of a minimum number of parts, particularly moving parts, and which, therefore, is unlikely to get out of order; one which is rugged and durable and which, therefore, will withstand rough usage; one which is capable of ease of assembly and disassembly for purposes of inspection or replacement of parts; one in which tool changeover operations are of a simple nature; and one which, otherwise, is well adapted to perform the services required of it, are further desirable features which have been borne in mind in the production and development of the present invention.

Other objects and advantages of the invention not at this time enumerated will become more readily apparent as the following description ensues.

In the accompanying three sheets of drawings forming

2 a part of this specification, two illustrative embodiments of the invention have been shown.

Figure 2:
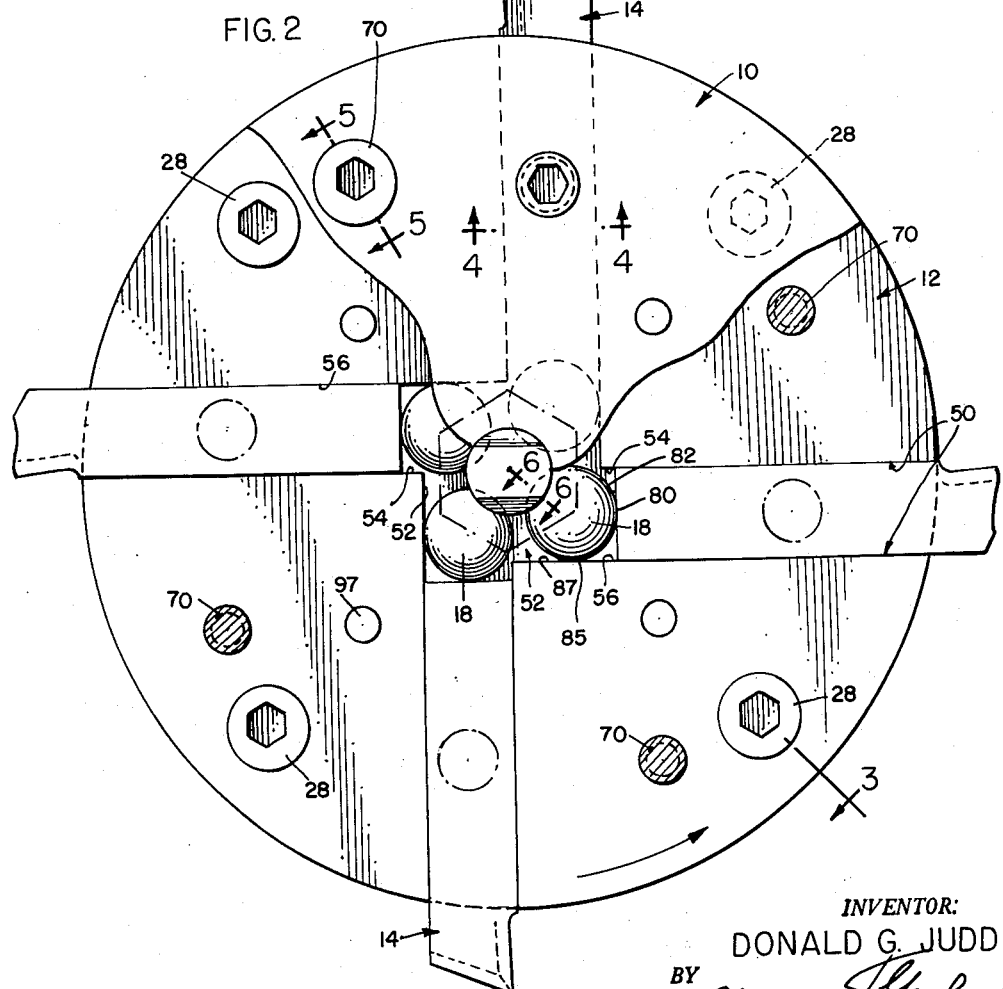

In these drawings:
FIG. 1 is a front perspective view of a multiple tool boring head constructed in accordance with the principles of the present invention;
FIG. 2 is an enlarged front elevational view of the boring head shown in FIG. 1 with portions of the front plate thereof being broken away to more clearly reveal the nature of the invention;
FIG. 3 is a sectional view taken substantially along the line 3—3 of FIG. 2;
FIG. 4 is a sectional view taken substantially along the line 4—4 of FIG. 2;
FIG. 5 is a sectional view taken substantially along the line 5—5 of FIG. 2;
FIG. 6 is a sectional view taken substantially along the line 6—6 of FIG. 2;
FIG. 7 is a sectional view similar to FIG. 3 showing a slightly modified form of boring head constructed in accordance with the invention; and
FIG. 8 is a fragmentary sectional view similar to FIGS. 3 and 7 showing a still further modified form of the invention.

Referring now to the drawings in detail, one form of the invention has been illustrated in FIGS. 1 to 6, inclusive. Briefly, the boring head of this form of the invention is of the rotary type and involves in its general organization front and back plates 10 and 12, respectively, between which plates there are confined a series of generally radially disposed tool bits 14 which are radially adjustable relative to the axis of rotation of the boring head. The various tool bits 14 are adapted to be moved in unison radially outwardly during the course of their adjustment under the control of a centrally and axially disposed adjusting screw 16 which operates through the medium of a series of hardened steel balls 18 to exert an outward thrust upon the transverse planar inner end faces of the various tool bits 14, all in a manner that will be made clear presently. The boring head is adapted to be operatively secured in position on a suitable adapter 20 associated with a conventional boring machine. In the form of the invention shown in FIGS. 1 to 6, inclusive, clearance regions for both the tool bits 14 and steel balls 18 are provided by relieving the opposed faces of both the front and back plates. The form of the invention shown in FIG. 7 is similar to that shown in the preceding views, but in this latter form, the clearance regions for the tool bits and steel balls are provided by relieving the inside face of only the back plate, as will likewise be made clear presently. The form of the invention shown in FIG. 8 is also similar to that shown in the preceding views, but involves the use of an integral adapter as will be explained in detail presently.

Referring now specifically to FIGS. 1 to 3, inclusive, the front and back plates 10 and 12 are both preferably of flat circular design and of equal diameter so that when they are juxtapositioned in the boring head assembly with the inside faces 22 and 24 thereof in face-to-face contact and in coaxial relationship as shown in FIG. 3, they serve to provide a generally cylindrical casing or tool bit retainer.

The back plate 12 is adapted to be bolted to the circular bolting flange 26 of the adapter 20 by means of a series of four equally spaced attachment bolts 28 which may be of the Allen head type and which pass through bores 30 provided through the back plate, have their head portions received in sockets 32 formed in the front face, and have their shank portions threadedly received in tapped holes 34 provided in the bolting flange 26 of the adapter 20. The hub portion 36 of the adapter 20 is provided with a threaded bore 38 for threaded reception of the drive spindle (not shown) of the boring machine. The hub portion 36 projects forwardly of the bolting flange 26 a slight distance to provide, in effect, a raised circular boss 40 which fits into a shallow circular recess 42 when the back plate 12 is operatively mounted on the adapter 20.

The back plate 12 is formed with a series of four diverging substantially radially extending grooves 50 therein, the grooves being provided in the front or inside face 24 and being rectangular in transverse cross section. Adjacent grooves 50 extend at right angles to each other and the four grooves intersect in the central regions of the back plate and the region of intersection thereof defines a central void or pocket 52. The various grooves 50 are slightly radially offset and the grooves are so disposed that the leading groove sides 54 (FIG. 2) are truly radial while the trailing groove sides 56 are radially offset to the extent of the groove width.

The front plate 10 is formed with a similar set of grooves 60, these latter grooves being formed in the rear or inside face 22 of the plate and being of the same size, shape and disposition in the front plate 10 as the previously described grooves 50 in the back plate 12. When the front plate is in its operative position on the back pltae as shown in FIGS. 2 and 3, the two sets of grooves 50 and 60 are in exact longitudinal alignment relative to the axis of the boring head assembly so that the mating grooves define therebetween a series of four slightly radially offset, outwardly diverging tool bit receiving bores 62 (FIG. 4) which are rectangular in transverse cross section and which communicate at their inner ends with a central chamber 64.

Each bore 62 is adapted to receive therein one of the tool bits 14. The combined depth of the grooves 50 and 60 in the back and front plates 10 and 12 respectively is slightly greater than the thickness of the tool bits 14 and the width of the grooves is slightly greater than the width of the tool bits so that the tool bits are confined within the bores 62 against turning movement about the axes of the tool bits but are permitted to slide radially within the grooves under the influence of the novel adjusting means of the present invention which will subsequently be set forth in detail.

The front plate 10 is adapted to be securely clamped to the back plate in axial alignment therewith and toward this end, a series of four clamping bolts 70, which preferably are of the Allen head type, have their head portions seated in sockets 72 (FIG. 5) formed in the outer or front side of the front plate 10, pass through bores 74 in the front plate, and are threadedly received in tapped holes 76 provided in the back plate 12. A series of four such clamping bolts 70 have been shown in FIG. 2. When the various bolts 70 are tightened, the dimensions of the various bores 62 are such as to permit the aforesaid frictional sliding movement of the various tool bits 14 radially within the bores.

As best seen in FIG. 2, the central chamber 64, afforded by the intersection of the various bores 62, receives therein a series of four of the hardened steel balls 18, one for each tool bit 14. Each ball 14 fits within the chamber 64 in approximate axial alignment or register with one of the tool bits and is adapted to bear radially outwardly against and make point contact as at 80 with the inner end face 82 of the tool bit.

The end faces 82 of the various tool bits 14 are planar and are shown herein as extending at right angles to the tool bit axes. It is contemplated, however, that these planar end faces may, if desired, lie in planes which are otherwise angularly disposed relative to the tool axes.

Each ball 18 is adapted to also bear and make point contact as at 84 (FIG. 6) with a frusto-conical portion or section 86 provided at the inner or rear end region of the previously mentioned adjusting screw 16 and the frusto-conical face of which also is in radial register with the various tool bits. Each ball 18 additionally makes point contact as at 85 with an extended wall portion 87 of the side 56 of the adjacent groove 50.

The adjusting screw 16 is formed with an enlarged threaded central or body portion 88 which is threadedly received through a threaded bore 90 formed centrally in the front plate 10. The enlarged threaded body portion 88 adjoins the frusto-conical portion 86 and the latter merges with a pilot stem extension 91 which extends into a pilot hole 92 formed centrally in the back plate 12. The extreme outer or forward end of the adjusting screw 16 is formed with a flattened or other non-circular portion 93 designed for cooperation with a suitable tool such as a wrench (not shown) by means of which the adjusting screw as a whole may be turned in the bore 90. The adjusting screw 16 has threadedly received thereon a lock nut 94 which, when tightened against the front face of the front plate 10, serves to lock the adjusting screw 16 in any selected position of adjustment.

From the above description, it will be observed that upon turning of the adjusting screw 16 in a direction to increase its threaded engagement with the bore 90 or to cause axial movement of the adjusting screw to the right as viewed in FIG. 3, the various hardened steel balls 18 will make camming engagement with or move outwardly on the frusto-conical surface 86 of the adjusting screw 16 and they will also bear against and move radially outwardly on the extended wall portion 87 of the side wall of the adjacent groove 50 and thus transmit their movement to the adjacent tool bit 14 which will be caused to slide radially outwardly within the respective bore 62 within which the tool bit is disposed.

The various tool bits 14 are adapted to be individually locked in any selected position of adjustment by means of a series of four locking screws 95, one for each tool bit, these locking screws being threadedly received in holes 96 extending through the front plate 10 in register with the rear faces respectively of the various tool bits 14.

To facilitate assembly of the front and back plates 10 and 12 respectively and effect precise alignment of the various grooves 50 and 60, the front plate carries a series of pilot rods 97, four such rods being illustrated herein. These pilot rods 104 are adapted to extend into pilot or locating holes 98 formed in the back plate 12.

Due to the extreme simplicity of the above-described boring head assembly, it is believed that the operation thereof will be readily apparent without detailed description. However, it is to be noted that after the various parts of the assembly have been properly juxtapositioned and the clamping bolts 28 tightened to securely clamp the front plate 10 to the back plate and define the various radial bores 62 between the plates, a permanent assembly will be effected and it will not be necessary thereafter to loosen the clamping screws except for dismantling of the assembly. The various tool bits 14 fit within the respective bores 62 with a snug yet sliding frictional fit so that when it is desired to effect an outward adjustment of the tool bits, it is merely necessary to loosen the various locking screws 95, as well as the lock nut 94, and apply a suitable tool to the flattened end 93 of the adjusting screw 16 for adjusting purposes. When the desired adjustment has thus been made, the lock nut 94 may be tightened against the rear or outside face of the front plate 10 and, thereafter, the individual locking screws 95 may be tightened against the faces of the tool bits 14.

It is obvious that by causing the slant angle of the conical portion 86 to bear a specific relation to the pitch of the threads provided on the threaded section 88 of the adjusting screw 16, a predetermined forward advance of the screw may be attained for any given angular increment of turning movement of the latter. Thus, a calibration scale such as has been shown at 99 in FIG. 1 may be applied to the front face of the front plate 10 for selective register with a calibration pointer 101 suitably inscribed on the adjusting screw.

The illustrated form of the invention shown in FIGS. 1 to 6 is purely exemplary and it is to be distinctly understood that the invention may assume other forms than the illustrated form. For example, although the front and back plates have been shown as being grooved to provide a series of four generally radially extending bores 62, a greater or lesser number of such bores may be provided, the number of permissible bores being dictated, of course, by the overall size of the boring head. Tool bits 14 of the various forms may be employed and it is not essential that the cross sectional shape of the tool bits be rectangular as shown herein since other cross sectional shapes are contemplated. It will be understood that where other cross sectional shapes are employed, the character of the grooves 50 and 60 in the back and front plates respectively will be modified to give the proper mating cross sectional shape to the bores 62 when the front plate is assembled upon the back plate.

In FIG. 7, a slightly modified form of the invention has been shown. The arrangement of parts shown in this latter view is similar to the arrangement of parts shown in FIG. 3 and, in order to avoid needless repetition of description, similar reference numerals but of a higher order have been applied to the corresponding parts in FIG. 7.

In the form of the invention shown in FIG. 7, the front plate 110 has not been grooved and the generally radially extending offset bores 162 for receiving the tool bits 114 exist solely by virtue of the grooves 150 provided in the back plate 112. These grooves are of a depth slightly greater than the thickness of the tool bits 114 and they also are of a width slightly greater than the width of the tool bits. The inside or rear face 122 of the front plate 110 is substantially planar.

In FIG. 8 another modified form of the invention has been illustrated. In this view, the front plate 210, adjusting screw 216, balls 218 and tool bits 214 remain substantially the same as in the form of the invention shown in FIGS. 1 to 6, inclusive, but the use of an individual back plate has been dispensed with, and, instead, the cooperating grooves 260 and 250 are formed in the front plate 210 and adapter 220, respectively. Otherwise, the boring head assembly remains substantially identical with the assembly of FIGS. 1 to 6, inclusive, so that by the application of reference numerals of a still higher order to the corresponding parts in FIG. 8, needless repetition of description may be avoided.

It is also within the scope of the invention to provide grooves in the adapter which are conformable to the grooves shown in the back plate of FIG. 7 and to provide a generally flat plate such as the plate 110 of FIG. 7 for cooperation therewith.

The invention is not to be limited to the exact arrangement of parts shown in the accompanying drawings or described in this specification as various changes in the details of construction may be resorted to without departing from the spirit of the invention. Only insofar as the invention has particularly been pointed out in the accompanying claim is the same to be limited.

Having thus described the invention what I claim as new and desire to secure by Letters Patent is:

A rotary boring head of the character described comprising front and back plates having planar opposed inside faces disposed in coextensive face-to-face contact, the inside face of each plate being formed with a plurality of radially diverging grooves which intersect in the central region of the plate and thus define a central pocket, the grooves and pockets of the two plates being in longitudinal register and defining therebetween a plurality of radially diverging tool bit retaining bores which communicate with one another in the central region of the boring head and, by their mutual communication, define an internal central chamber within the boring head, said grooves being rectangular in transverse cross section and having their leading sides, relative to the direction of rotation of the boring head, extending in a radial plane, the trailing side of each groove being extended so as to intersect with the leading side of a next adjacent groove and thus define one wall of said pocket, all of said grooves being of equal depth, said front plate being formed with a central axial opening therethrough and in communication with said chamber, a tool bit slidingly disposed in each bore and having its outer operative end projecting radially outwardly beyond the confines of the bore, an adjusting screw threadedly received through said opening and having a frusto-conical section at the rear end thereof within the chamber, and a hardened steel ball interposed between the inner end of each tool bit and said frusto-conical section of the adjusting screw, each ball making three-point contact with the frusto-conical section of the adjusting screw, the inner end of the adjacent tool bit and at least one of the extended sides of an adjacent radially diverging groove.

References Cited in the file of this patent

UNITED STATES PATENTS

| | | |
|---|---|---|
| 1,162,163 | Hickey | Nov. 30, 1915 |
| 1,366,733 | Jung | Jan. 25, 1921 |
| 1,373,717 | Enlund | Apr. 5, 1921 |
| 2,357,918 | Trippler | Sept. 12, 1944 |
| 2,472,554 | Volis | June 7, 1949 |
| 2,651,223 | Hahn | Sept. 8, 1953 |